(12) United States Patent
Malm (10) Patent No.: US 8,382,469 B2
(45) Date of Patent: Feb. 26, 2013

(54) METHOD AND APPARATUS FOR UTILISING FUGITIVE GASES AS A SUPPLEMENTARY FUEL SOURCE

(75) Inventor: Howard Leigh Malm, Coquitlam (CA)

(73) Assignee: Rem Technology, Inc., Calgary, Alberta (CA)

( * ) Notice: Subject to any disclaimer, the term of this patent is extended or adjusted under 35 U.S.C. 154(b) by 283 days.

(21) Appl. No.: 11/078,905

(22) Filed: Mar. 9, 2005

(65) Prior Publication Data

US 2006/0204909 A1 Sep. 14, 2006

(51) Int. Cl.
*F23N 1/02* (2006.01)
(52) U.S. Cl. ............... 431/5; 431/12; 431/115; 126/527
(58) Field of Classification Search .............. 431/5, 12, 431/115; 123/698, 537, 527
See application file for complete search history.

(56) References Cited

U.S. PATENT DOCUMENTS

| | | | | |
|---|---|---|---|---|
| 3,460,522 | A * | 8/1969 | Clarke et al. ................ | 123/520 |
| 3,516,756 | A | 6/1970 | Destival | |
| 3,616,779 | A * | 11/1971 | Newkirk ................... | 123/41.86 |
| 4,058,147 | A * | 11/1977 | Stary et al. ..................... | 141/45 |
| 4,680,004 | A * | 7/1987 | Hirt ................................. | 431/5 |
| 4,951,743 | A | 8/1990 | Henderson | |
| 5,070,850 | A * | 12/1991 | Davis et al. ................... | 123/527 |
| 5,163,467 | A | 11/1992 | Coe | |
| 5,209,656 | A * | 5/1993 | Kobayashi et al. ............ | 431/187 |
| 5,337,859 | A * | 8/1994 | Ingram et al. ................ | 184/6.21 |
| 5,400,751 | A * | 3/1995 | Grimmer et al. ............ | 123/192.2 |
| 5,450,728 | A | 9/1995 | Vora et al. | |
| 5,497,757 | A * | 3/1996 | Osanai .......................... | 123/674 |
| 5,507,146 | A | 4/1996 | Bjerklie | |
| 5,524,456 | A | 6/1996 | Stokes | |
| 5,634,454 | A * | 6/1997 | Fujita ............................ | 123/690 |
| 5,699,767 | A * | 12/1997 | Notsu et al. .................... | 123/323 |
| 5,740,682 | A | 4/1998 | Lavie | |
| 6,092,515 | A * | 7/2000 | Morikawa ..................... | 123/698 |
| 6,315,000 | B1 | 11/2001 | Goodyear | |
| 6,340,005 | B1 * | 1/2002 | Keast et al. ............... | 123/27 GE |
| 6,523,531 | B1 * | 2/2003 | Feldkamp et al. ............ | 123/698 |
| 6,737,604 | B2 * | 5/2004 | Surma et al. ............ | 219/121.37 |
| 6,742,335 | B2 | 6/2004 | Beck et al. | |
| 2001/0011539 | A1 * | 8/2001 | Ito et al. ........................ | 123/518 |

FOREIGN PATENT DOCUMENTS

| | | |
|---|---|---|
| CA | 2142199 | 3/1993 |
| CA | 2142138 | 2/1995 |
| CA | 2362641 | 4/2001 |
| CA | 2310557 | 11/2001 |
| FR | 2582383 | 11/1986 |

(Continued)

OTHER PUBLICATIONS

Fugitive Methane Emmision Reduction Using Gas Turbines. Parker, Todd. TransCanada PipeLines. 1998.
Proposed Design for Gas Turbine Ingestion of Dry Gas Seal Primary Vent Fugitive Methane. Parker, Todd. Proceedings of Int'l Pipeline conference.

(Continued)

*Primary Examiner* — Alfred Basichas
(74) *Attorney, Agent, or Firm* — John Russell Uren (57) ABSTRACT

Apparatus and method for collecting fugitive combustible gases and adding the gases as a supplementary fuel source to an engine. The fugitive combustible gases are added to the air inletted to the air supply and a control is provided to allow adjustment of the normal fuel supplied to the engine following the addition of the fugitive combustible gases. The fugitive combustible gases provide an energy source for the engine and the combustion of the gases reduces the greenhouse effect if the gases contain methane.

19 Claims, 8 Drawing Sheets

FOREIGN PATENT DOCUMENTS

| | | |
|---|---|---|
| GB | 750058 | 4/1954 |
| JP | 57206759 A | 6/1981 |
| JP | 57206759 A2 | 12/1982 |
| JP | 09060734 A2 | 4/1997 |
| RU | 2199054 | 2/2003 |
| TW | 432181 | 5/2001 |
| WO | WO 9616321 | 4/1996 |
| WO | WO 2004/044406 | 5/2004 |

OTHER PUBLICATIONS

Catalytic Combustion for Reduction of Fugitive Methane Emissions From Natural Gas Compressor Stations. R. Litto et al. University of Alberta.

VHP Technology, Product Training Centre, Waukesha Engine, Dresser, Inc. Undated.

\* cited by examiner

| Location | Device | | Flow – measured | Flow deduced (gas) |
|---|---|---|---|---|
| Instrument gas vent (control cabinet) | $V_4$ | Rotometer | 6.2 scf/m (air) | 7.7 scf/m (gas) |
| 546 I/P used for fuel valve | $V_3$ | Rotometer | <2 scf/m (air) | 0.6 scf/m (specs) |
| Compressor packing | $V_1$ | Micromotion | <0.5 lb/h | 0.7 scf/m (est) |
| Starter and blow-down vent | $V_2$ | Not measured | | |
| Total | | | | 9 scf/m |

Figure 4

METHOD AND APPARATUS FOR UTILISING FUGITIVE GASES AS A SUPPLEMENTARY FUEL SOURCE

This invention relates to a method and apparatus for adding combustible gases to the air supply of an engine and, more particularly, to adding fugitive or vent combustible gases to the air supply of the engine.

BACKGROUND OF THE INVENTION

Engines, turbines and heating units using natural gas and other gaseous fuels are known and are used extensively, particularly in locations where natural gas production takes place. Such engines and turbines range from 30 HP to over 10000 HP and may conveniently be used in powering gas compressors, pumps and electric generators and which powered equipment is normally associated with natural gas production. The heating units are used in a wide range of industrial processes. The natural gas or other gaseous fuel is introduced directly to the cylinder of the natural gas engine or to the intake manifold. A spark ignitor is typically used to ignite the combustible natural gas and an air supply adds the air necessary to support the combustion.

The gaseous fuel used for such engines, turbines or heating units comes from a fuel source such as natural gas and the air to support the combustion of the gas comes from the atmosphere. Normally, the gaseous fuel is under pressure and appropriate ducting extends from the pressurized fuel supply to the engine. A carburetor, valves or an electronic control mechanism is used to regulate the quantity of natural gas provided to the engine and the quantity of air added to the natural gas for efficient combustion.

Various production processes in natural gas production result in losses of combustible gases. Such gaseous losses typically occur from compressors, particularly where the packing is old or otherwise deficient, from pneumatic instrumentation utilising natural gas, from initiating or starting engine procedure using natural gas, from gas dehydration units, from engine crankcases and from petroleum liquid storage tanks. These gas losses, typically called "fugitive and/or vent emissions", are usually passed to the atmosphere or to a stack for burning. In either case, they are lost and the energy content of these gases which can be considerable, is similarly lost. It is disadvantageous and energy deficient to lose these fugitive or vent gases.

It is known to use natural gas as a supplementary fuel for a diesel engine by adding natural gas to the intake air. This natural gas, however, is not a fugitive or vent gas and the gas is maintained under pressure as a normal fuel source. The use of such fuel does not lower costs by using a fuel normally lost or deliberately discarded and such a fuel is not an emission resulting from venting or escaping gas. Fugitive gases have been collected and used as a fuel source but such gases have been collected and put under pressure. Such gases are not used as a supplementary fuel source.

SUMMARY OF THE INVENTION

According to one aspect of the invention, there is provided a method for introducing fugitive combustible gases to a combustion process device utilising a combustion process which process utilises a combustible fuel and air mixture, said method comprising providing a first fuel to said combustion process device, providing an air supply to said combustion process device, collecting said fugitive combustible gases and adding said fugitive combustible gases as a supplementary fuel to said air supply and controlling the quantity of said first fuel added to said device while adding said fugitive combustible gases used as said supplementary fuel to said air supply.

According to a further aspect of the invention, there is provided a method for introducing fugitive combustible gases to a natural gas engine, said method comprising adding said natural gas to said engine, providing air to said engine through an air supply, collecting said fugitive combustible gases and adding said fugitive combustible gases as a supplementary fuel to said engine while said engine is under operation and controlling the quantity of said natural gas fuel added to said engine while adding said fugitive combustible gases, said fugitive combustible gases being added to said engine through said air supply.

According to yet a further aspect of the invention, there is provided apparatus used for combusting fugitive combustible gases in a device using the combustion of a first fuel and air, said apparatus comprising a first source of said fugitive combustible gases, at least one collector to collect said fugitive combustible gases, a fuel supply to supply said first fuel, an air supply to provide air for said combustion of said first fuel and air, piping extending from said at least one collector to said air supply to supply said fugitive combustible gases to said air supply, and control means to adjust the quantity of said first fuel added to said device when said fugitive gases are added to said air supply.

According to still yet a further aspect of the invention, there is provided an engine used for combusting fugitive combustible gases using natural gas as a fuel and air added to said natural gas, said apparatus comprising a first source of said fugitive combustible gases, at least one collector to collect said fugitive combustible gases, a natural gas fuel supply, an air supply to provide combustion air for said natural gas, piping extending from said at least one collector to said air supply to supply said fugitive combustible gases to said air supply, and control means to adjust the quantity of said natural gas when said fugitive gases are added to said air supply.

According to still yet a further aspect of the invention, there is provided a control system for regulating the input fugitive and/or vent combustible gases as a supplementary fuel to a combustion process using a primary fuel, said system comprising a source of fugitive and/or vent combustible gases, a first passageway to conduct said combustible gases to an air inlet supplying combustion air to said combustion process, a second passageway to allow said combustible gases to bypass said first passageway and a diverter valve to allow at least a portion of said combustible gases to pass to either said first or second passageways.

BRIEF DESCRIPTION OF THE SEVERAL VIEWS OF THE DRAWINGS

Specific embodiments of the invention will now be described, by way of example only, with the use of drawings in which.

DESCRIPTION OF SPECIFIC EMBODIMENT

The terms "fugitive gases" or "fugitive combustible gases" or "fugitive emissions" or "fugitive gases" or "vent gases" or "vent emissions" are used throughout this specification. The terms are used interchangeably and, by the use of such terms, it is intended to include combustible gases which escape from various apparatuses or which are released deliberately into the atmosphere. Such combustible gases normally exist at or near atmospheric pressure in the vicinity of the sources from where they originate. These fugitive gases are intended to be collected and to be used as a supplementary fuel supply for an engine which, conveniently, uses natural gas as its primary fuel supply and which natural gas is pressurized before entering the engine. The various apparatuses from which the fugitive gases may escape include compressor cylinder packings, instruments, starting gas sources for the engine, gas dehydration units, crankcases, petroleum liquid storage tanks and the like.

Figure 1:
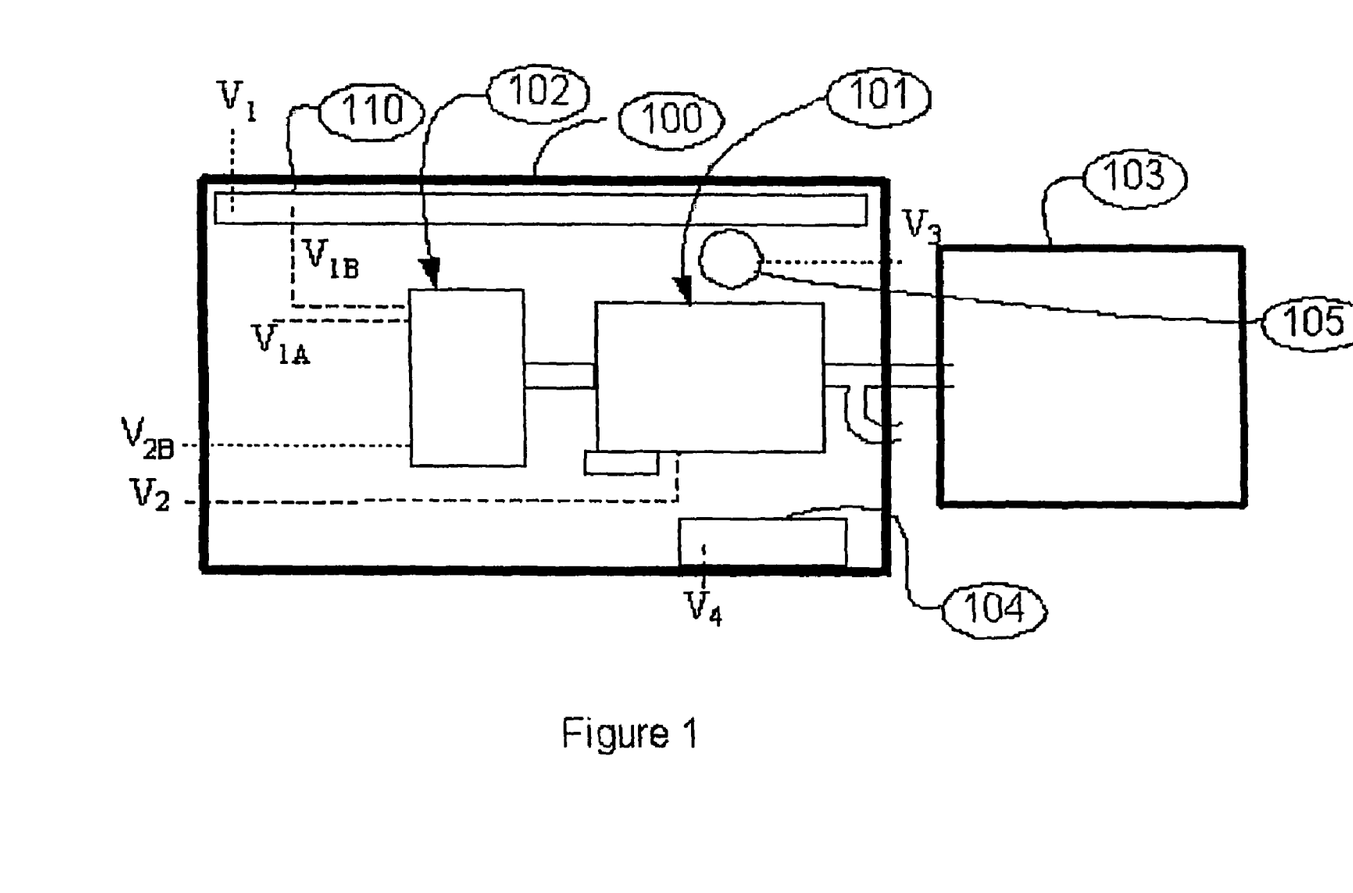
FIG. 1 is a diagrammatic illustration of a typical building housing an engine and a compressor driven by the engine and which illustrates various sources of fugitive combustible gases which may be used as a supplementary fuel source for the engine according to the invention.

Referring to the drawings, an engine is shown generally at 101 in FIG. 1. The engine 101 is conveniently a natural gas powered engine normally located at a place of natural gas production. The engine 101 powers a compressor generally illustrated at 102. The engine 101 and compressor 102 are normally located within a building 100. As is usual, an outside location for cooling apparatus 103 assists in drawing cooler air or cooling water for cooling purposes.

A cabinet 104 for housing various instrumentation used in support of the engine 101 and compressor 102 is located near the engine 101. A petroleum liquid storage tank 110 is also conveniently located within the building 100.

Emissions of fugitive combustible gases are shown as originating from four (4) sources in FIG. 1. $V_1$ represents the gases released from the petroleum liquid storage tank 110. $V_{1a}$ and $V_{1b}$ leakages originate from the compressor 102 which gases are routed into the petroleum liquid storage tank 110 and leave with leakage $V_1$. Leakages $V_{1a}$ and $V_{1b}$ represent leakages from the various packings used to seal the compressor 102 thereby to prevent the escape of gases. $V_2$ represents the fugitive emissions released from the crankcase of the engine 101. $V_3$ represents the gases released from the pneumatic control of a control valve 105 and $V_4$ represents the emissions released from the instrumentation used in support of the engine 101 and compressor 102, housed in cabinet 104.

Figure 2:
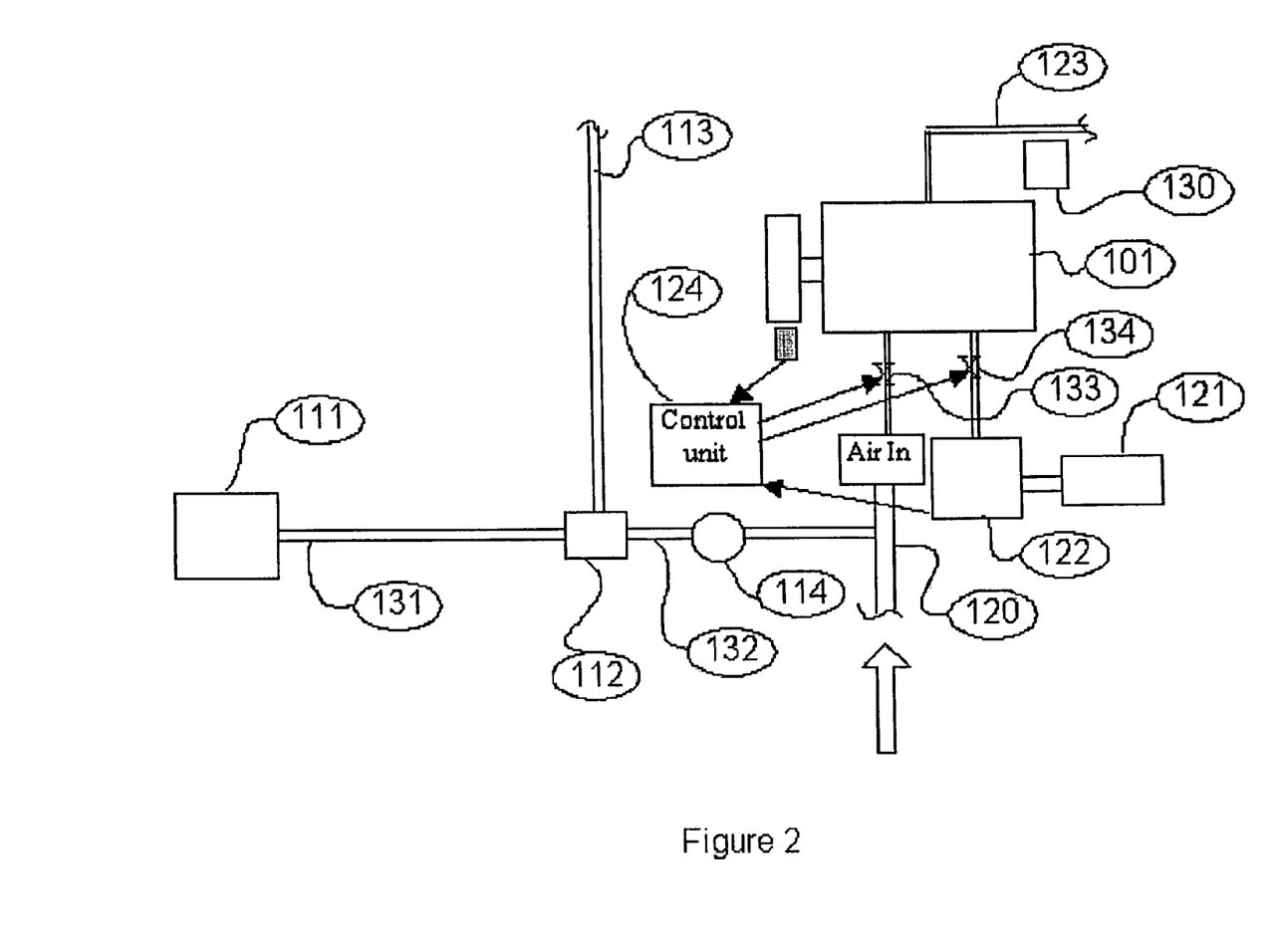
FIG. 2 is a diagrammatic illustration of a typical control circuit used to regulate the input of fugitive combustible gases to the engine according to the invention.

Referring to FIG. 2, the fugitive gases shown as being emitted from various locations within the building 100 of FIG. 1 are collected into a collector source 111 by way of appropriately sized and appropriately located ducting, piping, tubing and the like. These collected fugitive gases are fed into ducting 131 extending to a diverter valve 112 which, in a first configuration, passes the fugitive emissions to the normal vent or stack 113 to bypass the engine 101 and which, in a second configuration, pass the gases to a flow meter 114 and thence to the air intake 120 of the engine 101. The fugitive gases and the air enter the engine 101 from the air intake 120 through a control valve 133.

Fuel from the normal fuel source 121, conveniently natural gas in the case of a natural gas powered engine 101, passes to a fuel meter 122 and, thereafter, to the engine 101 through a control valve 134. Combustion products from engine 101 are exhausted through an exhaust stack 123. An exhaust analyzer 130 may monitor the combustion products from the engine 101 passing through the exhaust stack 123.

Various control techniques are contemplated as will be explained in greater detail. A control unit 124 is operatively connected to the fuel meter 122 and to the valves 133, 134 which control unit 124 controls the quantity of inletted fugitive gases and air and fuel from the normal fuel supply 121, respectively. Exhaust analyzer 130 may also be associated with the control unit 124. If, for example, the fugitive gases entering air intake 120 and engine 101 provide increased richness in the exhaust stack 123 as indicated by the exhaust sensor 130, the control unit 124 may adjust the quantity of air passing through valve 133 thereby maintaining the proper air-fuel ratio for efficient combustion within the engine 101.

Operation

With reference to FIGS. 1 and 2, the operation of engine 101 is initiated and will be operating with the normal fuel source 121 and the normal air supply entering the engine 101. The emissions of the fugitive gases from the various apparatuses 110, 101, 105 and 104 as represented by $V_1$, $V_2$, $V_3$ and $V_4$, respectively, will be collected with appropriate ducting and piping at fugitive emission collector source 111. The fugitive gases are then conveyed to the air intake 120 of engine 101 through ducting 131, diverter valve 112 and flow meter 114.

For safety reasons, the diverter valve 112 will normally divert the fugitive gases through stack 113 when the engine 101 is not running and the fugitive gases are still being collected. Alternatively, a holding container (not illustrated) may store the gases until the engine 101 commences operation. Or, the fugitive gases may be diverted to a flare stack (not illustrated) where they are burned.

Following the startup of engine 101, the position of diverter valve 112 is changed either manually or otherwise, so that the fugitive gases flow directly to the air intake 120 through ducting 132 and flow meter 114. Flow meter 114, located between the diverter valve 112 and the air intake 120, operates to measure the flow of the fugitive gases entering the air intake 120. The use of the fugitive gases operates to increase the fuel supply which enriches the fuel flow to the engine 101 thereby creating an increased engine speed. A governor (not illustrated) for measuring and controlling engine speed is operably connected to the engine 101 and the valve 134. As the engine speed increases, the governor will reduce the normal fuel supplied to the engine 101 by way of partially closing valve 134. This will act to reduce the normal fuel supplied to the engine 101 and return the engine speed to that desired. The reduced normal fuel supplied to the engine 101 will be replaced with that energy supplied by the fugitive gases thereby resulting in less use of normal fuel in the engine 101.

Depending upon the quantity of fugitive emissions available, the rate of flow of such emissions and the existing air-fuel control method for the combustion process, a variety of control techniques are available to adjust the normal fuel supplied to the engine 101 when the fugitive gases are being used as a supplementary fuel source.

For example and as previously described, an exhaust sensor 130 may be operably associated with the exhaust stack 123. The exhaust sensor 130 monitors the components in the exhaust of exhaust stack 123. If the exhaust sensor 130 senses hydrocarbon and/or oxygen content greater than desired, appropriate adjustment will be provided to either the air or fuel supply, the adjustment changing the percentage of hydrocarbons and/or oxygen in the exhaust stack thereby contributing to combustion of increased efficiency.

A further application utilises the techniques disclosed in U.S. Pat. No. 6,340,005 (Malm et al), the contents of which are herein incorporated by reference. The flow of the fugitive gases added to the inlet 120 of the engine 101 may be measured by a flow meter 114 as earlier set forth. As the rate of flow of the fugitive gases increases, the rate of flow of the normal pressurized fuel will decrease thereby causing the normal control system based on the quantity of normal pressurized fuel relative to the air supplied to deliver too little air. By combining the fugitive gas flow with the normal pressurized fuel flow, the control unit 124 will maintain the proper fuel-air ratio in engine 101 to provide for appropriate and efficient combustion. Thus, the normal fuel entering the engine 101 through fuel meter 122 is replaced by the supplementary fuel supply provided by the fugitive gas emissions and measured by flow meter 114. The fuel flow meter 114 can also be calibrated to ensure that the quantity of fuel added to the engine 101 by the fugitive emissions does not exceed the fuel supply required by the engine 101.

Figure 3A:
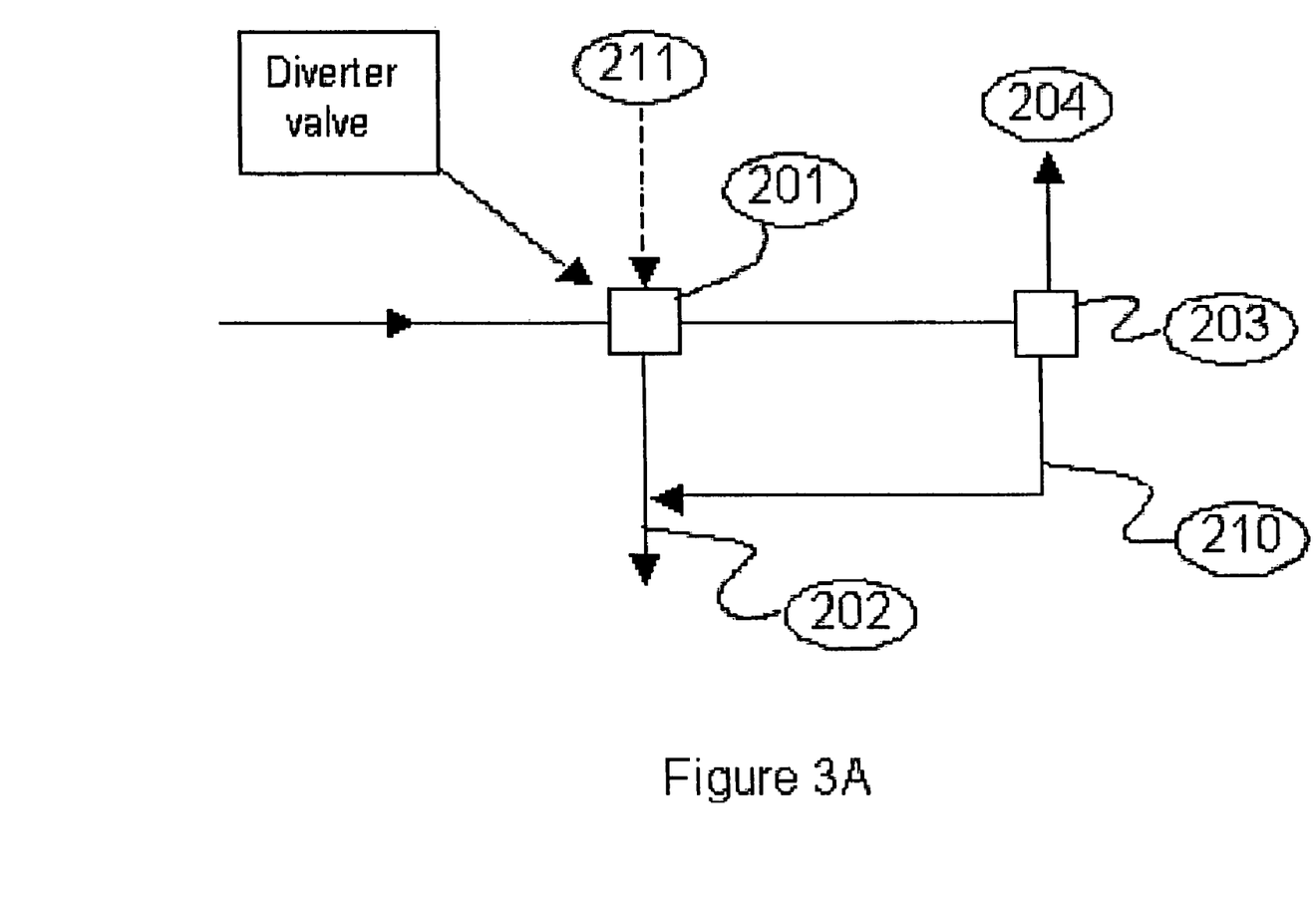
FIGS. 3A-3E diagrammatically illustrate various control techniques when fugitive gases are used as a supplementary fuel source for the engine according to the invention.

Yet a further control application is illustrated in FIG. 3A where manual control is used for the fugitive gases entering the air intake 204. A diverter valve 201 is provided which allows the fugitive gases to pass to the normal fugitive gas vent or stack 202 which may vent or burn the fugitive gases. A control signal 211 may provide that the diverter valve 201 pass all fugitive gases to the stack 202 in the event there is an engine failure or an engine shutdown. A three-way manual valve 203 is provided downstream of the diverter valve 201. This valve 203 provides for the entry of fugitive gases to the air intake 204 of the engine and it can be adjusted to regulate the quantity of fugitive gases to the air inlet 204 and to the fugitive gas stack 202 through piping 210. A slow addition of fugitive gases passed to the air intake 204 by adjusting valve 203 will minimize the engine speed change and will allow the operator to manually adjust the air-fuel ratio to account for the addition of the fugitive gases. When engine operation ceases, a control signal 211 moves the diverter valve 201 so that the fugitive gases vent to stack 202 in the normal manner. The three-way valve 203 should be selected so that the flow path of the fugitive gases is not blocked in any valve position which would stop the flow of fugitive gases and contribute to pressure buildup in the collection system 111 (FIG. 2). This technique is relatively simple and inexpensive and, under certain gas flow conditions, it is contemplated that the diverter valve 201 and the three-way valve 203 could be combined into a single valve.

A further embodiment of the control technology is contemplated wherein an exhaust gas sensor is provided which initiates a signal related to the amount of oxygen and/or unburned fuel in the combustion exhaust. Normally, this technique would use the signal to control the air/fuel ratio for the combustion. If the signal advised that the mixture was too rich, the normal air supplied to the engine would be increased and if the signal advised that the air/fuel ratio was too lean, the normal air supplied to the engine could be decreased. Similarly, the proportion of fugitive gases could be increased or decreased relative to the normal fuel entry. This control technique is generally referred to a closed loop air/fuel control.

Figure 3B:
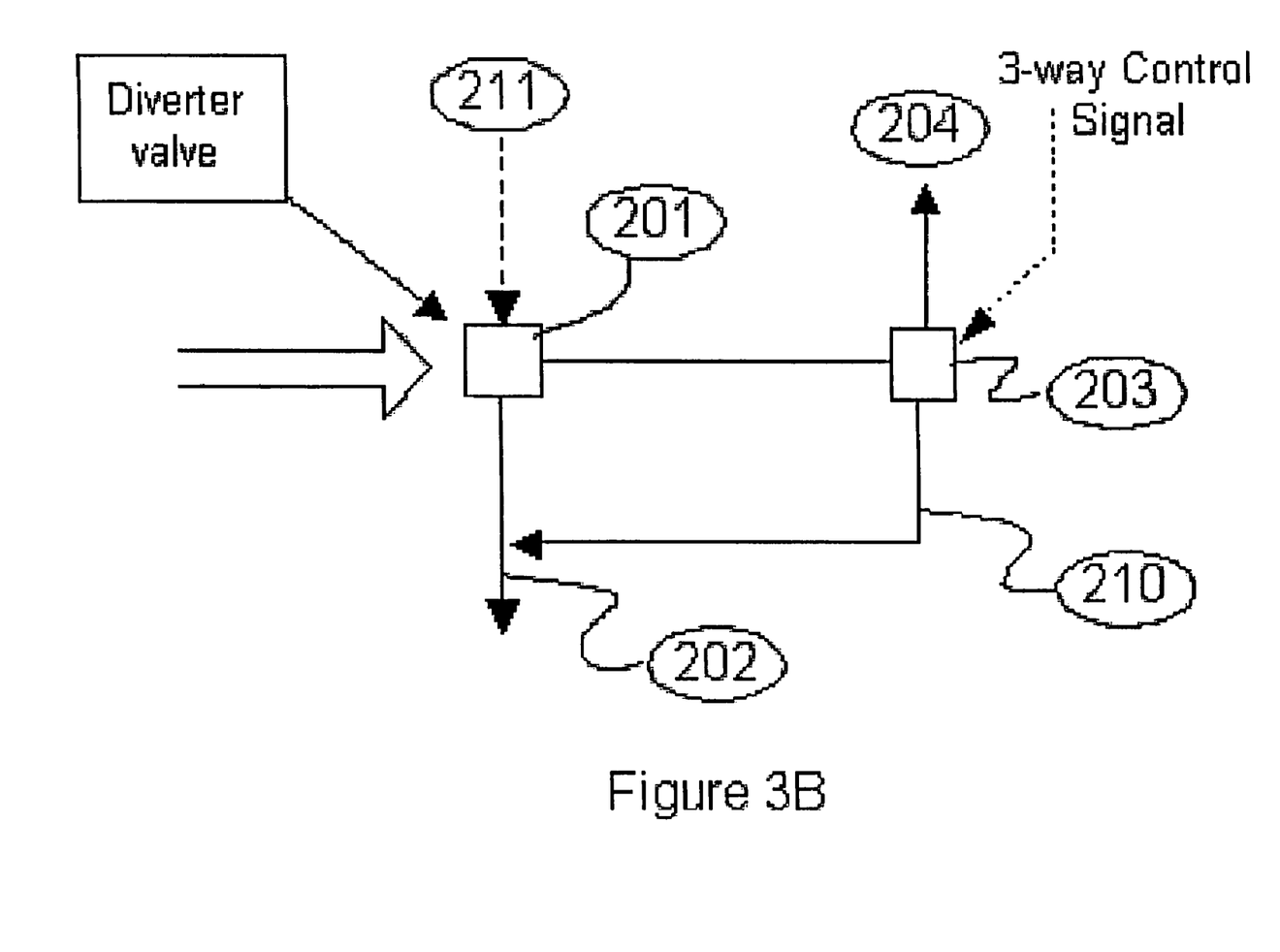

A further control technique is illustrated in FIG. 3B wherein automatic control of the three way valve 203 is provided which allows the control system to control the quantity of fugitive emissions diverted to the combustion air intake 204. If the addition of fugitive gases to the air intake 204 through valve 203 is excessive thereby prohibiting the engine speed from otherwise being automatically adjusted, a control signal advises the three-way valve 203 that any excessive quantity of fugitive gases are to be diverted to the fugitive gas stack 202. In this embodiment, it is contemplated that the diverter valve 201 could be deleted with control of the fugitive gases provided wholly by the three-way valve 203.

Figure 3C:
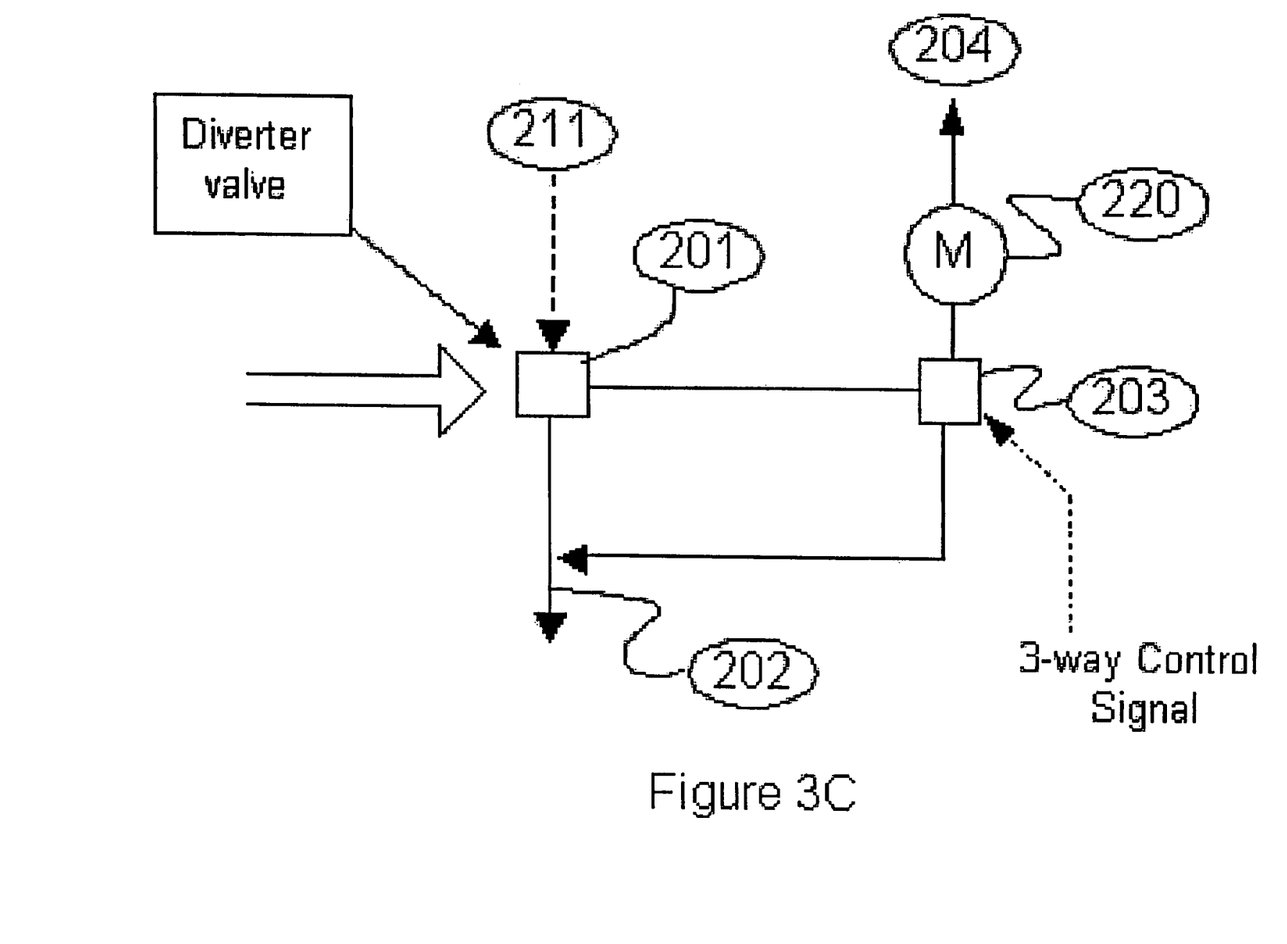

In yet a further control technique illustrated in FIG. 3C, a flow meter 220 is added upstream of the engine air intake 204 and downstream of three-way valve 203 to measure the quantity of fugitive gases added to the air intake 204. The information obtained from the flow meter 220 can be used to determine general operating characteristics and/or to determine the fraction of fuel used by the engine which originates with the fugitive gases. In this embodiment, the diverter valve 201 could be deleted with control provided solely by the flow meter 220 which would provide appropriate control signals to three-way valve 203.

Figure 3D:
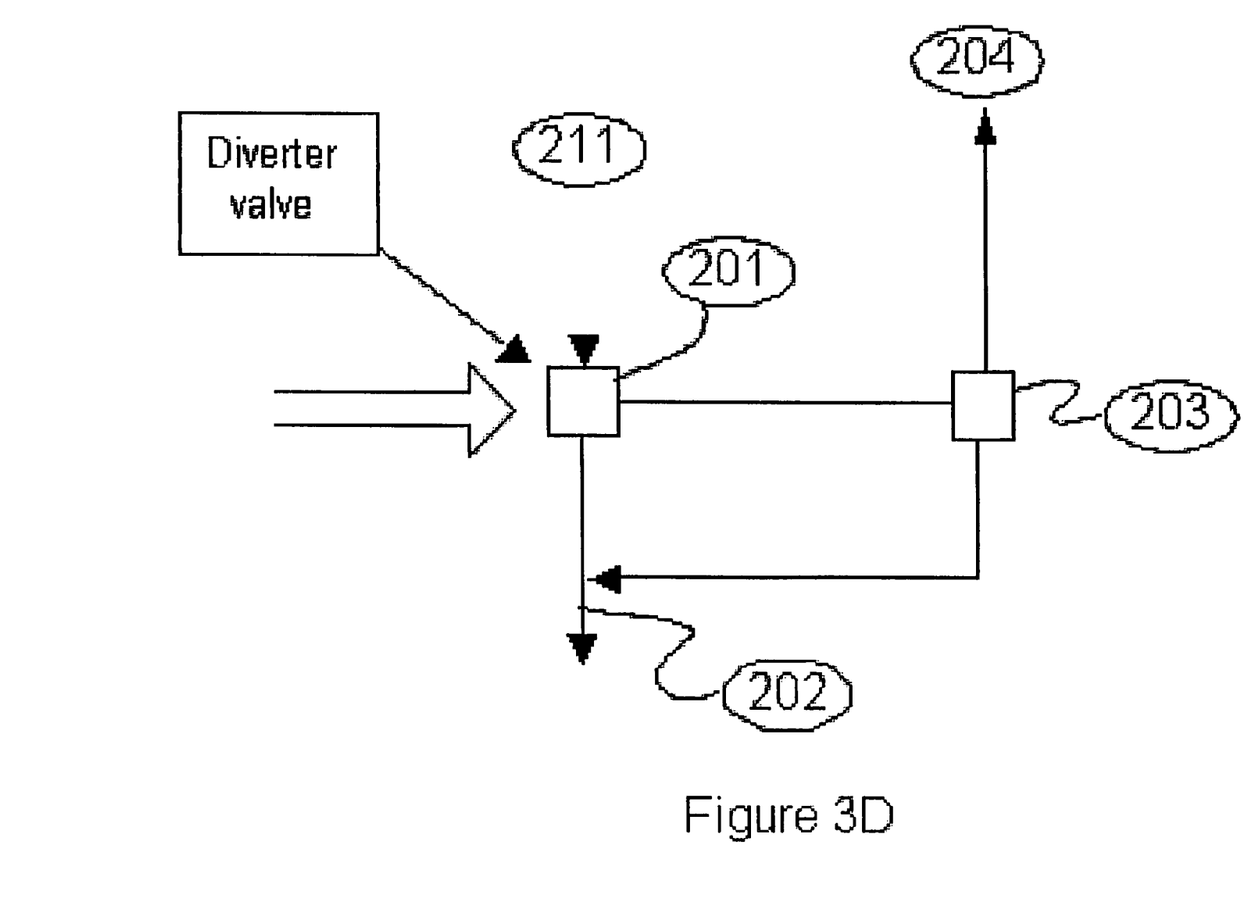

A further control technique using a combination of fuel flow measurement and manual control for the fugitive gases is illustrated in FIG. 3D. In this embodiment, as the fuel flow comprising normal fuel and fugitive gases increases, the control system will increase the air flow to the air intake 204. If the flow of fugitive gases is relatively constant, following the initiation of the fugitive gas flow, the control system can be adjusted to compensate for the addition of the fugitive gases. Diverter valve 201 ensures that the fugitive gases are vented in the event of engine shutdown or a safety hazard arising. Any changes in the rate of flow of the fugitive gases will be done manually since no automatic adjustment of the fugitive gas flow rate is provided in this case.

Figure 3E:
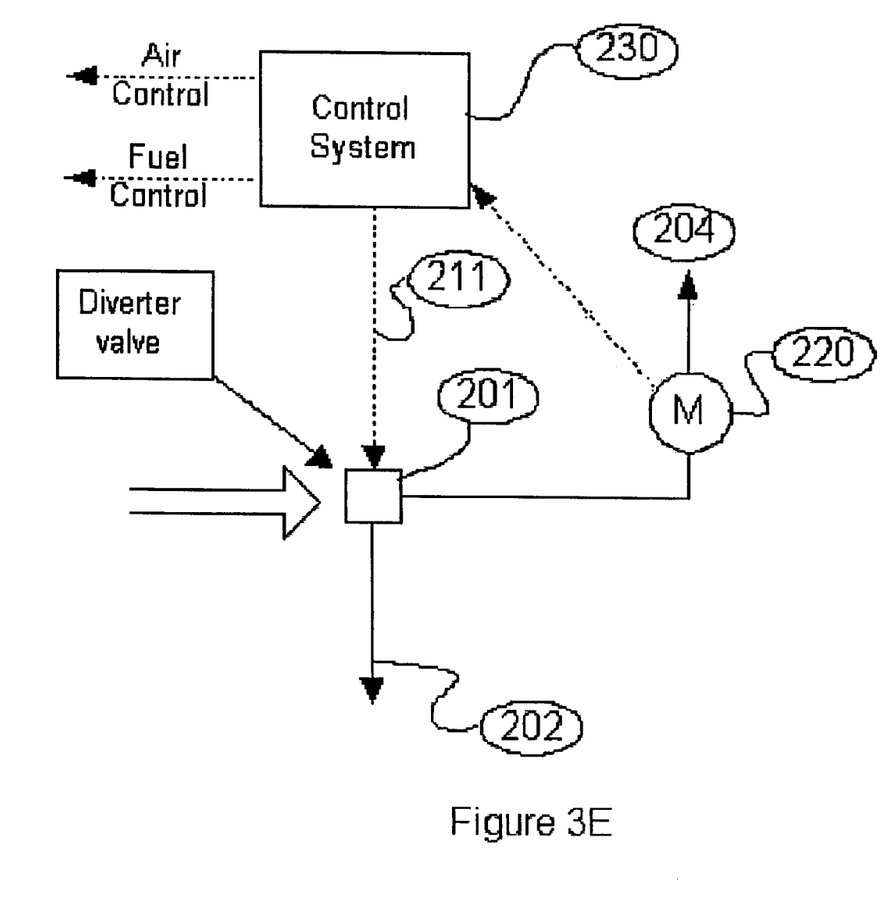

A further control technique is illustrated in FIG. 3E. The control system 230 utilises fuel flow measurement and fugitive flow measurement with the air-fuel ratio being controlled by the rate of air flow to the combustion process. To maintain the desired air-fuel ratio, a fugitive gas flow meter 220 is required. The fugitive gas flow measured by meter 220 is added to the normal combustion fuel flow value and the control system 230 will use the input from flow meter 220 to determine the proper quantity of air to be added to the air intake 204. In the event, for example, that the fugitive gas flow is small, the control system 230 is contemplated to be sufficient to determine the correct air quantity without the use of flow meter 220. For higher flows of fugitive gases, however, the fugitive gas flow signal from flow meter 220 can be used as a feed-forward signal to adjust the combustion fuel control valve (not illustrated) coincident with the addition or removal of the fugitive gases. This fugitive gas flow value is again useful for operating information and/or to determine the fraction of fuel used by the engine which may come from the fugitive gases.

In the interest of full disclosure, experiments which have been performed by the applicant are set forth below. In addition, the potential savings thought to be achievable by using fugitive emissions as a supplement fuel source are calculated. It is emphasized that these experiments and calculated possible savings have not been measured in a technically rigorous manner, nor have they been corroborated. Rather, the experiments conducted and the subsequent discussions based on those experiments are included here as being corroborative of the advantages thought to be achievable only. Applicant would not want to be bound by the experimental results given hereafter if subsequent measurements or calculations are found to be more precise or if subsequent experiments and calculations adversely affect the results described and the discussions based on those results.

EXAMPLE 1

For a typical 1000 HP natural gas engine, the amount of methane used would be approximately 1000×7500/900=8300 scf/h=139 scf/m where scf/m=standard cubic feet per minute. The average packing leak as found in reciprocating compressors is described in "Cost Effective Leak Mitigation at Natural Gas Transmission Compressor Stations", Howard et al, Pipeline Research Council International, Inc., (PRCI) Catalogue No. L51802e, the contents of which are herein incorporated by reference. The measurements reveal that the leaks amount to approximately 1.65 scf/m per rod packing. For a four (4) throw compressor, this would amount to 6.60 scf/m or 5% of the fuel required for the above-identified engine. If natural gas is used for the pneumatic instrumentation, gas venting can increase to 10 scf/m or more. In addition to packing leaks, other sources of fugitive hydrocarbon gas emissions include the engine crankcase, the compressor crankcase, glycol dehydrators, petroleum liquid storage tanks, engine starting systems and unit blow downs during gas venting operations.

EXAMPLE 2

Figure 4:
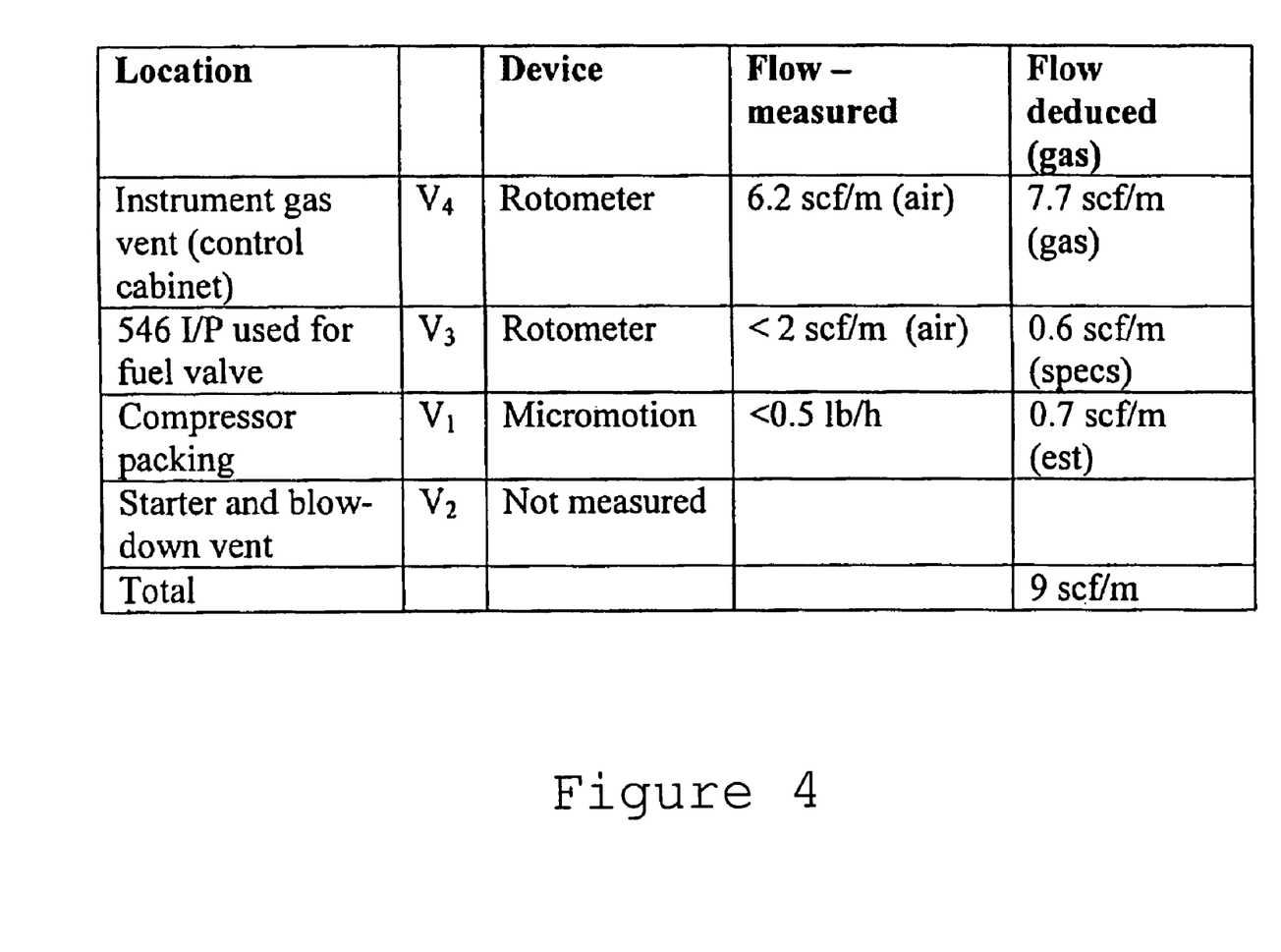
FIG. 4 is a table illustrating fugitive gas emissions taken from various sources in a typical operating environment during experimentation.

Other sources of fugitive gases in a typical operating environment such as the engine compressor unit located within the compressor building 100 illustrated in FIG. 1 were measured. The results of those measurements are given and set forth in FIG. 4. The vent flow measurements were taken by a rotometer which was calibrated for air and then multiplied by a correction factor for natural gas. It will be seen from FIG. 4 that the total estimated fugitive emissions by the sources measured amount to approximately 9 scf/m which is the value used in the calculations given hereafter. It will further be noted the term 546 I/P stands for a Fisher 546 model current/pressure transducer. A current to pressure transducer (I/P) takes a 4 to 20 ma control signal from the controller and coverts it to a proportional gas pressure. This gas pressure then controls a diaphragm on a control valve.

The fuel flow consumption was approximately 138 kg/h at 932 rpm. The estimated load percentage based on fuel was 72% by using the manufacturer's specifications for the maximum load capacity and comparing it with the actual load for the engine estimated from the operating conditions. Using a fuel density of 0.79 kg/m3, the fuel flow is (138 kg/h/0.790 kg/m3)×(35.3 ft3/m3)/60 min/h=103 scf/m. Thus, the fugitive emissions released at this location amounted to approximately 8.7% (9 scf/m/103 scf/m=8.7%) of the total engine fuel consumption.

EXAMPLE 3

A test was undertaken to add fugitive gases to the engine inlet of a Waukesha 7042 GSI engine modified for lean operation which powered a four (4) throw, two (2) stage Ariel JGK-4 compressor. Only the vent gas $V_4$ from the instrument cabinet 104 (FIG. 1) was used. This was so because the cabinet 104 used for housing the instruments provided a convenient source for fugitive gases from the instrumentation and a convenient place to connect a rubber hose for conveying the gases first to a three-way valve and then to the engine air intake. The three way valve was positioned in the hose between the cabinet and engine air intake thereby allowing the gas to be vented or directed to the air intake and which also allowed a sample of the gas to be taken. A subsequent gas analysis confirmed that the fugitive or vent gas measured was principally a combustible hydrocarbon mixture. The speed of the Waukesha engine was set to 932 rpm and the measured suction pressure at the compressor intake remained relatively constant during the test, ranging between 347 to 358 kPa, which confirmed the relatively constant engine load during the test.

When the fugitive gases from the instrument cabinet 104 were initially directed to the air intake of the engine, the engine speed initially increased and then recovered to the set point of 932 rpm. The fuel flow recorded by the engine flow meter dropped from 126.6 kg/h to 115.2 kg/h which indicated a potential fuel saving of about 10 kg/h. The exhaust oxygen dropped from 7.6% to 6.6%. The air control valve was then adjusted to bring the exhaust oxygen percentage back to the approximate starting value. The decrease in fuel flow for the engine operating with the same exhaust oxygen percentage was (126.6−118.6)=8 kg/h which was a decrease of approximately 6.3%. To check this value, the gas flow through the vent was measured at a value of 5.6 scf/m (air) or 6.6 scf/m (gas). Converting this flow to metric mass flow gave a value of 8.8 kg/h. This correlated with the decrease in fuel flow observed with fuel enrichment by way of the fugitive gas supply to the air inlet.

EXAMPLE 4

Based on the measurements given above, the savings in fuel would be in the range of CDN$20000.00 to CDN$30000.00 per year for this engine. Since the fugitive gas emissions are normally vented and lost, and assuming the gas price of $5.00/GJ (Giga Joule)=5.27/MMBTU (million British Thermal Units)=$4.79/Mscf (thousand standard cubic feet) (GHV (Gross Heating Value)=1100 BTU/scf), the lost value of the vented gas is CDN$3100/year for gas vented at 1 scf/m. Thus, the value of the vented gas from the compressor building alone was calculated to be approximately CDN$25,000.00 per year.

EXAMPLE 5

In this case, the fugitive emissions were mostly methane. These emissions contribute to greenhouse gas (GHG) emissions. A calculation reveals that the fugitive emissions and the engine $CO_2$ result in the equivalent or estimated GHG emission ($CO_2(e)$) of 4900 Tonnes per year (=$CO_2$ mass/y+21× $CH_4$ mass/year). If the fugitive emissions are used as fuel by the engine, the $CO_2(e)$ would drop to 3010 Tonnes per year, a decrease of 40% or 1890 T/y. Thus, this is contemplated to provide a good technique for the reduction of greenhouse gases.

Many modifications may readily be contemplated to the invention. Although the teachings are specifically directed to a natural gas engine where natural gas is used as the normal fuel, the fugitive gases are contemplated to be a useful supplementary fuel source for other engines, including diesel and gasoline powered engines and turbines. Indeed, with appropriate controls, it is contemplated that the fugitive gases may be usefully added as a supplementary fuel to virtually any device using the combustion of air and fuel where the fuel may be liquid or gaseous so long as the fuel is combustible.

In addition, although the invention has been described as providing for the fugitive gases to emanate from a storage tank to an engine and compressor located within a building, the presence of a building is of course unnecessary and quite optional. The engine and/or compressor and/or storage tank may be instead located in the open.

Many further modifications will readily occur to those skilled in the art to which the invention relates and the specific embodiments herein described should be taken as illustrative of the invention only and not as limiting its scope as defined in accordance with the accompanying claims.

I claim:

1. A method for introducing fugitive combustible gases to a natural gas engine utilising natural gas as a fuel source and an associated fuel tank which holds said natural gas, said natural gas engine utilizing a combustible fuel and air mixture to power additional equipment mechanically connected to said natural gas engine, said method comprising providing a first principal fuel being natural gas from said fuel source via said fuel tank to said natural gas engine at a positive pressure substantially above atmospheric pressure, providing an air supply to said natural gas engine, adjusting the air or air-fuel mixture supply to said natural gas engine, collecting said fugitive combustible gases in an unconverted state from at least one device additional to said natural gas engine and said associated fuel tank, said at least one device being compressor cylinder packing, instrumentation, a starting gas source for said natural gas engine, a gas dehydration unit or a liquid petroleum carrying storage tank and adding said fugitive combustible gases in said unconverted state as a supplementary fuel at or near atmospheric pressure to said air supply during normal operation of said natural gas engine while controlling the quantity of said first principal fuel added to said natural gas engine, said fugitive combustible gases from said at least one device additional to said natural gas engine and said associated fuel tank being used as said supplementary fuel for said natural gas engine to reduce the quantity of said principal fuel required for said natural gas engine and providing power from said natural gas engine to said additional equipment mechanically connected to said natural gas engine, said fugitive combustible gases being vented to the atmosphere when said natural gas engine terminates operation.

2. A method as in claim 1 wherein said fugitive combustible gases include methane.

3. A method as in claim 1 wherein said natural gas engine commences operation utilising said first principal fuel and said fugitive combustible gases are added to said natural gas engine following the commencement of said operation of said natural gas engine.

4. A method as in claim 3 wherein said natural gas engine has a governor which is provided to control the speed of said engine, said governor increasing or decreasing the quantity of said first principal fuel to said engine dependent upon said addition of said fugitive combustible gases to said air supply.

5. A method as in claim 4 and further comprising a control source operatively associated with said first principal fuel to adjust said quantity of said first principal fuel added to said engine following said the addition of said fugitive combustible gases to said air supply of said engine.

6. A method for introducing fugitive combustible gases to a natural gas engine which engine provides output power to equipment mechanically connected to said engine, said method comprising adding said natural gas to said engine as a first principal fuel and under a substantial positive pressure, providing combustion air to said engine through an air supply, collecting said fugitive combustible gases and adding said fugitive combustible gases as a supplementary fuel in an unconverted state from said collection to said air supply of said engine at or near atmospheric pressure while said engine is under operation, said fugitive combustible gases being generated from at least one device additional to said engine and its associated fuel supply, said at least one device being compressor cylinder packing, instrumentation, a gas dehydration unit or a petroleum liquid carrying storage tank and controlling the quantity of said natural gas fuel added to said engine while adding said unconverted fugitive combustible gases.

7. Apparatus used for combusting fugitive combustible gases in a natural gas engine associated with a natural gas fuel source, said natural gas engine using the combustion of natural gas being a principal fuel and air, said apparatus comprising at least one source of said fugitive combustible gases additional to said natural gas engine and said natural gas being said principal fuel source associated with said engine, equipment located downstream from said engine being mechanically connected to and powered by said engine, at least one collector to collect said fugitive combustible gases from said at least one source of said fugitive combustible gases in an unconverted form from said at least one source, a fuel supply to supply said first principal fuel under a substantial positive pressure to said engine, an air supply entering said engine to provide air for said combustion of said natural gas, piping extending from said at least one collector to said air supply to supply said fugitive combustible gases to said air supply at or near atmospheric pressure and in said unconverted form, said piping having a bypass mode exposed to the atmosphere to allow said fugitive combustible gases to exhaust to said atmosphere upon termination of the operation of said engine and control means to adjust the quantity of said first principal fuel added to said engine when said fugitive combustible gases are added to said air supply, said at least one source of said fugitive combustible gases being compressor cylinder packing, instrumentation, a gas dehydration unit or a petroleum liquid carrying storage tank, said fugitive combustible gases being unconverted prior to said combustion when said fugitive gases emanate from said compressor cylinder packing, said instrumentation, said gas dehydration unit or said liquid petroleum carrying storage tank.

8. A natural gas engine used for combusting fugitive combustible gases used as a supplementary fuel, said engine comprising a first source of natural gas being used as a principal fuel for said engine, said natural gas being introduced to said engine at a substantial positive pressure, a source of air to provide combustion air to said engine which air is added to said natural gas, a source of said fugitive combustible gases from at least one device additional to said engine and said first source of natural gas, said at least one device being compressor cylinder packing, instrumentation, a starting gas source for said engine, a gas dehydration unit or a petroleum liquid carrying storage tank, at least one collector to collect said fugitive combustible gases from said at least one device in an unconverted form from each of said one devices, piping extending from said at least one collector to said air provided to said engine to supply said unconverted fugitive combustible gases to said engine at or near atmospheric pressure, control means to adjust the air-fuel mixture when said fugitive gases are added to said air provided to said engine and equipment mechanically connected to and powered by said engine, said fugitive combustible gases received from said at least one device being unconverted prior to said introduction of said fugitive combustible gases to said air provided to said engine.

9. A control system for regulating input fugitive and/or vent combustible gases for an engine, said control system comprising at least one collector for collecting said fugitive and/or vent combustible gases from at least one source, said fugitive combustible gases being used as a supplementary fuel to said engine, said fugitive combustible gases being unconverted from said at least one source within said collector, said at least one source being compressor cylinder packing, instrumentation, a starting gas source for said engine, a gas dehydration unit or a liquid petroleum carrying storage tank which liquid petroleum carrying storage tank is not used as a source of principal fuel for said engine, a primary fuel source providing said first principal fuel to said engine, said engine providing mechanical power to equipment, said control system further comprising first ducting to conduct said unconverted fugitive and/or vent combustible gases to an air inlet of said engine at or near atmospheric pressure in an unconverted form from said at least one source, said air inlet further supplying combustion air to said engine with said unconverted fugitive gases, a stack to allow said fugitive and/or vent combustible gases to bypass said first ducting, said stack terminating at an exit which is exposed to the atmosphere, and a diverter valve to allow at least a portion of said fugitive and/or vent combustible gases to pass to either said first ducting or said stack.

10. Control system as in claim 9 wherein said diverter valve is manually controlled.

11. Control system as in claim 9 wherein said diverter valve is controlled by a controller.

12. Control system as in claim 11 and further comprising a flow meter to measure the flow of said combustible gases in said first ducting.

13. Control system as in claim 12 wherein said flow meter provides a signal to said controller to indicate when a predetermined flow rate of gases passes through said flow meter.

14. Control system as in claim 9 and further comprising a flow meter to measure the flow of gases in said first ducting.

15. Control system as in claim 14 and further comprising a controller, said flow meter providing a signal to said controller to indicate when a predetermined flow rate of gases passes through said first ducting.

16. A control system for regulating input fugitive and/or vent combustible gases for a combustion process device using a principal fuel, said control system comprising at least one collector for collecting said fugitive and/or vent combustible gases being used as a supplementary fuel in an unconverted form to said combustion process device, said fugitive and/or vent combustible gases being used as a supplementary fuel to reduce the quantity of said principal fuel, said fugitive combustible gases originating from at least one source and being in said unconverted form, said at least one source being compressor cylinder packing, instrumentation, a starting gas source for said combustion process device, a gas dehydration unit or a petroleum liquid carrying storage tank wherein said petroleum liquid storage tank is not used as a principal fuel source for said combustion process device, a primary fuel source providing said first principal fuel, said combustion process device being an engine to provide mechanical power to equipment powered by said engine, said control system further comprising first ducting to conduct said fugitive and/or vent combustible gases in said unconverted form to an air inlet at or near atmospheric pressure, said air inlet further supplying combustion air to said combustion process device, a stack to allow said fugitive and/or vent combustible gases to bypass said first ducting, said stack terminating at an exit which is exposed to the atmosphere, and a diverter valve to allow at least a portion of said fugitive and/or vent combustible gases to pass to either said first ducting or said stack, piping to allow said fugitive or vent combustible gases to pass to said air inlet and a second valve to direct at least a portion of said fugitive and/or vent combustible gases to said air inlet and at least a portion to said piping, said diverter and second valve being controlled by a controller and a flow meter to measure the flow of said fugitive combustible gases in said first ducting.

17. Control system as in claim 16 wherein said flow meter provides a signal to said controller to indicate when a predetermined flow rate of said fugitive combustible gases pass through said flow meter.

18. A control system for regulating input fugitive and/or vent combustible gases for a combustion process device having a principal fuel source to provide principal fuel to said combustion process device, said control system comprising at least one collector for collecting said fugitive and/or vent combustible gases being used as a supplementary fuel to said combustion process device in an unconverted form, said fugitive and/or vent combustible gases originating from at least one source, said at least one source being compressor cylinder packing, instrumentation, a starting gas source for said combustion process device, a gas dehydration unit or a petroleum liquid carrying storage tank wherein said petroleum liquid storage tank is not used as a principal fuel source for said combustion process device, said combustion process device being an engine to provide mechanical power to equipment powered by said engine, said control system further comprising first ducting to conduct said fugitive and/or vent combustible gases to an air inlet of said engine at or near atmospheric pressure and in an unconverted form from said at least one source, said air inlet further supplying combustion air to said engine, a stack to allow said fugitive and/or vent combustible gases to bypass said first ducting, said stack terminating at an exit which is exposed to the atmosphere, a diverter valve to allow at least a portion of said fugitive and/or vent combustible gases to pass to either said first ducting or said stack, said first ducting terminating at said air inlet and further comprising a flow meter to measure the flow of gases in said first ducting.

19. Control system as in claim 18 and further comprising a controller, said flow meter providing a signal to said controller to indicate when a predetermined flow rate of gases passes through said first ducting.

* * * * *